United States Patent [19]

Kolar et al.

[11] 4,168,985

[45] Sep. 25, 1979

[54] BINDING AGENT BASED ON CEMENT CLINKER

[75] Inventors: Karel Kolar; František Škvara; Jaroslav Novotny, all of Prague; Zdenek Zadak, Kolín; Vladimir Satava, Prague; Josef Zezulka, Hodonín; Zdenka Bazantová; Vladimir Weiss, both of Prague, all of Czechoslovakia

[73] Assignee: Ceskoslovenska akademie ved, Prague, Czechoslovakia

[21] Appl. No.: 886,412

[22] Filed: Mar. 14, 1978

[30] Foreign Application Priority Data

Mar. 30, 1977 [CS] Czechoslovakia .................. 2114-77
May 12, 1977 [CS] Czechoslovakia .................. 3112-77

[51] Int. Cl.² ............................................. C04B 7/02
[52] U.S. Cl. ................................ 106/90; 106/314; 106/315

[58] Field of Search .................. 106/90, 315, 89, 314

[56] References Cited

U.S. PATENT DOCUMENTS

| 3,689,294 | 9/1972 | Brunauer | 106/315 |
| 3,754,953 | 8/1973 | Martin | 106/315 |
| 4,019,918 | 4/1977 | Wills | 106/315 |

*Primary Examiner*—James Poer

[57] ABSTRACT

A binding agent setting even at temperatures below +8° C., or also at temperatures substantially lower, is manufactured on the basis of cement clinker of high specific surface area and contains as admixtures forming water, compounds based on lignosulfonates, and, if need be, also further admixtures for preparation of mortars and concretes, as is sand, rough compact and porous aggregates, regulating additives, wetting agents and dyes.

6 Claims, No Drawings

BINDING AGENT BASED ON CEMENT CLINKER

The invention pertains to a binding agent based on cement clinker. More exactly, it pertains to binders which may be used in a broad temperature range representing the magnitude of several tens of centigrades, while the lower limit of this range may be deeply below 0° C.

The enhanced fineness of grinding of cement, i.e. attainment of the higher degree of disintegration of clinker and its additives, as gypsum, slag, and other materials of similar character, is one of the methods for increasing the strength of the cement paste after its hardening. The question how fine should be the ground cement or/and its admixtures had been the cause of controversy among world's experts for a long time. In the forties of this century, the opinion was mostly advocated that the acceptable lower limit of particle size is about 10 micrometers and that only the certain portion of ground material can be used to attain the optimum strengths. The objections to the very finely ground cement comprised namely the easy wetting and clotting during storage, the tendency to the separation of layers in concreting owing to washing off with water, the increasing consumption of formation water, the increased cement-water ratio, the earlier onset of hardening, the extended time of hardening, and the increasing value of the initial heat evolution. Higher contraction during hardening leading to the material predisposed to the formation of cracks was also objected. In addition, the risk arose that the agent retarding the hardening of mixture become dehydrated and that the economical conditions of production get worse due to the expense of grinding.

It was further objected that the increase of strength is relatively lowered with the increasing specific surface area and that the cements with the same specific surface area and the different particle size exhibit different strengths, while the finest portions of cement have only little influence on the overall trend of strength.

In recent years, the opinion of experts experienced a considerable change, especially owing to the fact that the technology of finely ground cement was successfully solved. Several years ago, the increased grinding fineness, e.g. from 8 to 10 percent of fraction remaining on the screen of 4900 mesh/cm$^2$ to 0–3 percent of such fraction, required by 50 to 300% higher manufacturing cost. The grinding to even higher fineness made the manufacturing substantially more costly and required special technological arrangements because too much air is present among the fine particles of ground material which coated the cement particles and formed an air cushion.

However, the result of modern investigation has fundamentally changed and corrected the former opinion. For example, S. Brunauer in the U.S. Pat. No. 3,689,294 (1972) stated that the high strengths of hardened cement pastes, mortars, and concretes may be attained without the admixture of gypsum by addition of other hardening regulators.

Thus, he described the method for manufacturing of the high-expansion cement of specific surface area ranging between 600 and 900 m$^2$/kg based on the crushed and ground clinker of portland cement with addition of at least 0.002 weight parts of an auxiliary grinding agent. The manufacturing consists in blending of the ground cement with at least 0.0025 weight parts of alkali lignosulfonate or alkali earth lignosulfonate or a sulfonated lignin and with 0.20 to 0.28 weight parts of water containing at least 0.0025 weight parts of alkali carbonate calculated on one part of the ground cement. The same author further described in the Australian Patent No. 447,431 (1974) the application of an auxiliary grinding agent, for example diethyl carbonate, containing a polar and a nonpolar group, and the application of calcium lignosulfonate and potassium carbonate. J. Žežulka et al. described in the Czechoslovak Patent No. 175,802 (1976) grinding of cement clinker in the presence of 0.2 to 4wt. % of powdery salts of lignosulfonic acids and K. Kolář et al. dealt in the Czechoslovak Patent No. 175,803 (1976) with the use of the cement mixture containing 0.2 to 4 wt. % of salts of lignosulfonic acids, 0.01 to 2 wt. % of alkali carbonate, and 2 wt. % of boric acid calculated on the total amount of cement clinker.

According to the practical experience, the commonly known cement mixtures exhibit highest strengths at the grain size up to 30 μm, while the cements with grains above 30 μm have only a little effect on the course of hardening. On the other hand, the contraction of articles as well as the evolution of heat substantially increase in the dependence on fineness, namely if the particle size decreases below 7 μm. The mixtures containing the particles of size 0 to 2 μm harden already so rapidly, that the hardening can be scarcely slowed down by addition of a retarder. As it is known, the particle size of contemporary common cements ranges from 0 to 200 μm, while 40 to 50% of the mixture is formed by rougher particles of grain size higher than 30 μm. Consequently, it had been assumed that sorting out the mentioned rougher particles and their post-grinding might contribute to the improvement of strength. However, further investigation led to the unexpected finding that the optimum improvement of cement strength cannot be attained by the mere removing of the border granule sizes of cement clinker but by the selection of quite particular granulations and by the accurate pre-specified set-up of their mutual ratio. It also proved reasonable an advantageous to ensure the granulometric composition of ground clinker also on the basis of other hardening regulators than is gypsum in order that the final mixture after hardening should exhibit the high initial and final strengths. The knowledge of the particle sizes of clinker smaller than 5 μm proved to be particularly inevitable because it has the decisive importance for influencing the strength growth. Beside this, it is necessary to know the optimum mutual ratio of ligno-sulfonates and carbonates and, if need be, also of other hardening regulators which may sensitively affect the properties of cement pastes. The practical experience has further shown that it is reasonable and advantageous, not only to work the new types of binders and binder components of increased strength, but to obtain at least the part of newly composed materials which exhibit the improved properties also in hardening at various atmospheric temperatures and in various surrounding mediums. In other words, it proved reasonable and necessary to prepare the new types of binders which harden in the substantially broader temperature region than the articles known till the present time and to prevent in this way the disadvantageous effect of low temperature which interferes with the setting and hardening of binders (T. C. Powers et al.: "Theory of Volume Changes in Hardened Portland Cement Paste during Freezing", Res. and Des. Lab. PCA (1954) 48, (1954) 49.) Because this appears at temperatures below the range 17° to 20° C., one usually requires to stop the working of portland cement if the temperature drops below −6° C. Various cements with the reduced hardening time and with the relatively high initial hardening heats were tested to prevent the interference of low temperature with hardening of portland cement. Also investigations are known which lowered the hardening temperature by addition of 1 to 4 wt. % of calcium chloride, sodium carbonate, potassium carbonate, or sodium sulfate etc. For example, S. A. Mironov (Theory and Methods of Winter Concreting, Prague 1953) recommended mixing of calcium chloride with sodium chloride and L. H. Tuthil [A. C- Standars—Recommended Practice for Winter Concreting, J. Amer. Concr. Inst. 27 (10), 1023 (1956)] proposed for concreting in a cold weather the aeration of worked mixtures in the presence of 1 wt. % of calcium chloride. However, the disadvantageous fact is that the proposed calcium chloride increases the volume of formed gels and interferes with their hardening and that also the contraction values increase.

The binding agents known up to now are also disadvantageous at low temperatures, i.e. in the application of binders based on the cements of class at least 450 at the mean dayly temperature +5° C., in working of binders based on the cements of lower classes than 450 at the mean dayly temperature +8° C. and in environments where temperature decreases below 0° C. In such cases, the temperature of worked mixtures has not to decrease below +15° C. in common applications of binders and below +10° C. in the concreting of massive structures. However, the temperature of the components of concrete mixture during transportation and deposition into a structure has to be at least +5° C. and during preparation of the concrete mixture for rubble concrete at least +10° C., with respect to the heat loss caused during charging and blending of the material. The surface temperature of setting and hardening monolithic concrete and reinforced concrete structures has not to decrease for 72 hours below +15° C., or below +10° C. at massive structures (Czechoslovak Standard No. 73'2400: "Performance and Inspection of Concrete Structures" VUNM 1970).

These requirements cannot be met and observed with the binders known up to the present time, especially in application at the permanently low mean temperatures of atmosphere or at deeper decreases of the outside temperature.

It further appeared as reasonable and advantageous to develop also the binders which would not have the above mentioned shortcomings, namely which will set even at the substantially lower mean temperatures than are the values permitted by valid standards or rules.

The given aims have been attained by this invention, which pertains to a binding agent, based on the ground cement clinker, setting also at low temperatures of environment, i.e. below +8° C., which contain the addition of formation water and of at least 0.0025 weight percent of the material based on lignosulfonate, calculated on the total amount of cement clinker, and, if need be, also further admixtures necessary for preparation of mortars and concretes, as for example, sand, rough compact and porous aggregates, regulators, wetting agents, and dyes.

The substance of the invention is the composition of binding agent, which consists of 5 to 99.94 weight percent of cement clinker with the specific surface area from 250 to 3000 m$^2$/kg, containing 5 to 95 weight percent of particles with the size up to 5 micrometers, and of 0.05 to 80 weight percent of formation water, calculated on the total amount of cement clinker. The clinker may consist, at the same time, from two to four fractions, where the mean value of the particle size of each fraction is at least threefold the mean particle size of the next fraction, while at least 50% of the particles of each fraction has the size in the region given by the deviation ±20% from the mean particle size.

Further admixture of the binder may be 0.01 to 8 weight percent of an alkali metal salt, advantageously of carbonate, while the ratio of alkali metal salt to the lignosulfonate based material ranges between 4:1 and 1:4. The admixture may be also an oxygen-containing compound of boron, powdered aluminum, an oxygen-containing compound of antimony, or a mixture of two or more such materials in the amount of 8 weight percent at utmost, calculated on the total amount of cement clinker.

The invention employs the knowledge that the material having the regulation and, if need be, also the plasticizing effect, as lignosulfonate, or an alkali metal salt in the certain ratio to lignosulfonates, or oxygen-containing boron compounds, powdered aluminum, oxygen-containing antimony compounds, organic hydroxyacids and their salts, etc., may be successfully used as the setting regulators instead of gypsum in the binding agent based on the cement clinker of the composition according to the invention. For example, boric acid is the very sensitive regulator and favourably affects the rheologic properties of cement pastes where it causes the viscosity decrease after certain period of time. The suitable combination of the mentioned regulators enables to form the paste of low viscosity and the cement-water ratio 0.20 or lower and, consequently, to attain the materials with high initial and final strengths.

The pastes of finely ground clinker, according to this invention, allow to prepare the materials of setting time ranging from 10 minutes to several hours. The material hardens within 5–15 minutes after setting. The strength of materials prepared according to the invention, namely the compressive strength, increases very rapidly, e.g. the values 6.0 to 8.0 MPa are attained after about 4 hours and 45.0 to 90.0 MPa after 24 hours with the paste of low viscosity in the range of $10^0$ to $10^1$ Pa.s.

To attain the given values, it is the condition that the portion of clinker particles of granulation 5 μm or lower is higher than 5 weight percent. The binding agent based on cement clinker, according to the invention, may contain also clinkers ground to the high specific surface areas of values as high as 3000 m$^2$/kg, which allows its advantageous application also for highly demanding or delicate work or also for work at low temperatures, for example, in the region from +8° C. to −40° C.

Until the registration date of this application, neither sealing materials nor binders based on silicates have been known or described which contained the cements of class at least 450 and set at the average temperatures substantially lower than +5° C. or contained the cements of class lower than 450 and set at the average temperatures substantially lower than +8° C. and generally set when the temperature decreased deeply below 0° C. First the authors of this invention succeeded in finding that the mixtures described in the preceding text may be used as binders setting even in the temperature region +8° C. to −40° C. The binding agents according to this invention may be used for numerous purposes: in the manufacturing and repairs of separate construction units or parts, in the repairs and adaptations of statues and sculptures, e.g. of antiquary ones. The work can be done both at the normal temperatures above +8° C. and at lower temperatures, particularly at the temperatures below 0° C. down to the boundary of −40° C.

The advantages of this solution are obvious from the following examples of performance which illustrate the substance of the invention without limiting its scope by any means.

EXAMPLES 1 TO 13

Note: The cement clinkers were ground for the preparation of binders alone, without admixtures of gypsum and similar materials, were identified for distinguishing as Hra, Ma, and Pch, and differed one from another by the grain size and the content of particles smaller than 5 μm. The abbreviation Hra means the sample from the locality of cement works Hranice, Ma means the sample from the locality of cement works Maloměřice, and Pch the sample from the locality of cement works Prachovice in Czechoslovakia. The mixtures containing various amounts of water, clinker, and further admixtures were prepared from the clinkers and further admixtures.

The specimens of size 2×2×10 cm and 4×4×16 cm were made for strength tests from the pastes prepared from the described mixtures. Viscosity was measured in a rotation viscometer with coaxial cylinders at the velocity gradient 95 s$^{-1}$. The velocity of paste setting was followed by penetration of needle by the Vicat method (Czechoslovak Standard No. 722,115); the specific surface area of ground clinkers was determined according to Blaine (Czechoslovak Standard No. 722,114) and by calculations from granulometric analyses. The portion of particles with the granulation smaller than 5 μm was determined from sedimentation curves obtained with the automatic sedimentation balances Sartorius.

The molded specimens were allowed to rest for 1 h in the medium of relative humidity 90–95% and then stored in tap water of temperature 20° C. before they were tested.

The actual data from tests are given in the following Table, where the abbreviations Nalig means sodium lignosulfonate of purity higher than 98 wt.% and Calig means calcium lignosulfonate of purity higher than 64 wt.% in amounts calculated on the total amount of clinker in the binder.

TABLE

| Example no. | Origin of clinker | Sp.surface area m$^2$/kg | Particles smaller than 5 μm wt. % calculated on the total amount of clinker | Water | Admixture |
|---|---|---|---|---|---|
| 1 | Pch | 250 | 5 | 25 | 2 Calig<br>1 K$_2$CO$_3$ |
| 2 | Pch | 560 | 24.6 | 25 | 1.5 Nalig<br>1 Na$_2$CO$_3$ |
| 3 | Ma | 706 | 29.8 | 25 | 1 Nalig<br>1 Na$_2$CO$_3$ |
| 4 | Hra | 730 | 29.4 | 25 | 3 Nalig<br>2 K$_2$CO$_3$ |
| 5 | Hra | 730 | 29.4 | 25 | 3 Nalig<br>2 K$_2$CO$_3$<br>3 Sb$_2$O$_3$ |
| 6 | Hra | 730 | 29.4 | 25 | 2 Nalig<br>1 Na$_2$CO$_3$<br>1 Al powd. |
| 7 | Pch | 740 | 31.0 | 25 | 2 Nalig<br>1.5 K$_2$CO$_3$ |
| 8 | Pch | 740 | 31.0 | 30 | 2 Nalig<br>1 K$_2$CO$_3$ |
| 9 | Pch | 740 | 31.0 | 25 | 2 Nalig |
| 10 | Pch | 740 | 31.0 | 25 | 2 Nalig<br>1 K$_2$CO$_3$<br>1.5 H$_3$BO$_3$ |
| 11 | Pch | 970 | 34.8 | 25 | 2 Nalig<br>1 K$_2$CO$_3$ |
| 12 | Pch | 970 | 34.8 | 20 | 2 Nalig |
| 13 | Pch | 2700 | 85 | 40 | 2 Nalig<br>1 K$_2$CO$_3$ |

TABLE (continuation)

| Example no. | Viscosity Pa.s | Setting time,min | Compression strength, MPa, after: 3h | 1 day | 3 | 7 | 28 days | 90 | 360 |
|---|---|---|---|---|---|---|---|---|---|
| 1 | 1.30 | 595 | — | 5.0 | 21.0 | 30.0 | 50.0 | 57.0 | — |
| 2 | 1.21 | 60 | — | 34.0 | 48.1 | 65.3 | 69.0 | 100. | — |
| 3 | 1.35 | 30 | 2.0 | 8.0 | 21.0 | 59.0 | 118. | — | — |
| 4 | 2.13 | 25 | 7.5 | 47.8 | 70.0 | 77.5 | 99.0 | — | — |
| 5 | 2.02 | 40 | — | — | — | — | — | — | — |
| 6 | — | 35 | — | — | — | — | — | — | — |
| 7 | 1.45 | 30 | 6.0 | 48.6 | 56.5 | 57.0 | 825 | 101. | 125. |
| 8 | 1.20 | 40 | — | — | — | — | — | — | — |
| 9 | 1.62 | 12 | — | — | — | — | — | — | — |
| 10 | +) | 180 | — | 45.6 | 65.4 | 67.0 | 69.0 | 99.0 | 100. |
| 11 | 2.43 | 30 | — | 81.0 | 90.0 | 117. | 130.9 | — | 150. |
| 12 | 5.206 | 10 | — | — | — | — | — | — | — |
| 13 | mortar | 12 | 20.0 | 100. | 110. | 120. | 130. | — | — |

+) Viscosity changes in time: after mixing of the paste, the viscosity 2.81 Pa.s is stable for 40 min and then sharply drops as low as to 0.82 Pa.s and remains such low until the mixture solidifies.

TABLE (continuation)

| Example no. | Bending strength after 28 days, MPa |
|---|---|
| 1 | 5.3 |
| 2 | 13.4 |
| 3–6 | — |
| 7 | 8.0 |
| 8–9 | — |
| 10 | 8.0 |
| 11 | 13.3 |
| 12 | — |
| 13 | — |

EXAMPLE 14

The mortar is prepared from the finely ground cement clinker of specific surface area 600 m$^2$/kg (according to Blaine) and from sand of a continuous granulometry added to the cement clinker in the ratio 3:1. At the cement-water ratio 0.33, 1 wt.% of sodium hydroxycarbonate is added into the formation water and 2 wt.% of sodium lignosulfonate into the resulting mortar, calculated on the weight of starting clinker. The specimens for strength tests of size 4×4×16 cm are made from the prepared mortar which sets within 25 to 30 minutes and are then placed for 24 hours in saturated water vapors and then in tap water. The test carried out at temperature 20° C. show the compression strength 3.0 MPa after 8 hours from mixing of the mortar, 27.6 MPa after 24 hours, 40.0 MPa after 7 days, and 50.0 MPa after 28 days.

EXAMPLE 15

Preparation of Cement Paste

The cement paste is worked at temperature +3° C. from the ground cement clinker of Prachovice cement works, having temperature −7° C., the specific surface area (according to Blaine) 730 m$^2$/kg, and containing 30 weight % of particles smaller than 5 micrometers. After mixing for 5 minutes in water of temperature +2° C., the paste is obtained with the cement-water ratio 0.23 which contains 2 wt.% of sodium lignosulfonate and 1 wt.% of potassium carbonate, calculated on the total weight of the cement. A mold with the paste is stored at the environmental temperature −6° to −8° C. The paste sets after about 30 to 40 minutes, the mold is taken off after 12 hours, and the body is stored before strength testing at the temperature between −6° to −8° C. The compression strength determined after 24 hours of resting is 3.7 MPa, after 7 days 30.0 MPa, and after 28 days 45.0 MPa.

EXAMPLE 16

Preparation of Silicate Bonding Agent

The binder is prepared in the 1:3 ratio at temperature +5° C. from the finely ground clinker of Prachovice cement works having the specific surface area (according to Blaine) 700 m$^2$/kg and 24 wt.% of particles smaller than 5 micrometers, from sand of temperature −7° C. and the continuously decreasing granulation, and from water of temperature +2° C. Sodium lignosulfonate and potassium carbonate are added to the mixture in the amount of 1.8 and 1.4 wt.%, respectively, calculated on the total amount of clinker. The resulting mortar of cement-water ratio 0.31 is, after 15 minutes of mixing, charged into molds and stored in stillstand at temperature −6° C. to −8° C. The paste sets after 30–40 minutes and hardens after 60 minutes. The formed bodies are removed from the mold after about 4 hours and stored at temperature −6° to −8° C. The bodies exhibit the strength 3.3 MPa after 24 hours, 20.0 MPa after 7 days, and 24.0 MPa after 28 days.

EXAMPLE 17

Preparation of the Silicate Binder for Repairs of Sculptures

The ground clinker of Hranice cement works with the specific surface area 2900 m$^2$/kg and temperature +20° C. is mixed in the ratio 1:3 with sand of continuously decreasing granulation at temperature +5° C. and with water at temperature +3° C. Sodium lignosulfonate (3 wt. %), sodium carbonate (2 wt. %), and orthoboric acid (1.1 wt. %) are added to the mixture. The mixture has after 20 minutes of mechanical stirring the cement-water ratio 0.40, is filled into molds and allowed in stillstand at temperature −6° to −8° C. before strength testing. The articles set after about 15 minutes and harden after 20 minutes. The tests show that the compression strength 9.0 MPa is attained after 3 hours from the starting mixing of mortar, 18.0 MPa after 24 hours, 50.0 MPa after 7 days, and 60.0 MPa after 28 days.

EXAMPLE 18

Preparation of Binding Agent

The procedure is repeated as in Example 13 with the distinction that the work is done at temperature 15° C. and that cement, sand, and water have temperature +20° C. After perfect blending of the mixture, the molds with the non-set binder are placed at the environmental temperature −18° to −21° C., after 12 hours of stillstand the molds are taken off and the articles are stored in the same medium before the mechanical tests are performed. The resulting articles exhibit the compression strength 4.5 MPa after 24 hours, 9.1 MPa after 7 days, and 10.0 MPa after 28 days.

EXAMPLE 19

Preparation of Mortar

The mortar is prepared similarly as in Example 14 with the distinction that 0.3 weight % of sodium potassium tartrate is added into the forming water, calculated on the total amount of cement. The mortar sets after 80 minutes. The compression strength 50 MPa is attained after 24 hours and 83 MPa after 28 days.

What we claim is:

1. A cementitious binding agent comprising an admixture of
   (a) a cement portion having a specific surface area greater than 15 m$^2$/kg, between 5 and 99.94 weight percent of said portion having a specific surface area of from 250 to 3000 m$^2$/kg and containing between 5 and 95 weight percent of cement particles having a size up to 5 micrometers; and
   (b) at least 0.0025 weight percent, based on the weight of said cement portion, of a lignosulfonate compound; and
   (c) from 0.05 to 80 weight percent, based on the weight of said cement portion, of formation water.

2. A cementitious binding agent according to claim 1 wherein the cement portion comprises between 2 and 4 succeeding and differently sized fractions, the mean particle size of each fraction being at least the threefold mean particle size of the next succeeding fraction, each fraction containing at least 50% of particles of actual size within ±20% of the mean particle size of said fraction.

3. An agent according to claims 1 or 2 wherein the admixture further includes 0.01 to 8 weight percent of alkali metal salt.

4. An agent according to claim 3, wherein said alkali metal salt is an alkali metal carbonate.

5. An agent according to claim 3, wherein the ratio of alkali metal salt to lignosulfonate compound is from 4:1 to 1:4.

6. An agent according to claims 1 or 2, wherein the admixture further includes in amount up to 8 weight percent based on the weight of said cement portion of a material selected from the group consisting of boron-oxygen containing compounds, antimony-oxygen containing compounds, organic hydroxy acids, salts of organic hydroxy acids and mixtures thereof.

* * * * *